(12) United States Patent
Hinds (10) Patent No.: US 7,540,138 B2
(45) Date of Patent: *Jun. 2, 2009

(54) SUGAR CANE LOADER EQUIPPED WITH C-SHAPED CHAIN PILER WITH GRAB GUIDING DURING LOADING

(75) Inventor: Michael Lynn Hinds, Thibodaux, LA (US)

(73) Assignee: Deere & Company, Moline, IL (US)

( * ) Notice: Subject to any disclaimer, the term of this patent is extended or adjusted under 35 U.S.C. 154(b) by 112 days.

This patent is subject to a terminal disclaimer.

(21) Appl. No.: 11/677,104

(22) Filed: Feb. 21, 2007

(65) Prior Publication Data

US 2008/0199280 A1    Aug. 21, 2008

(51) Int. Cl.
*A01D 43/02*    (2006.01)
*B65G 47/90*    (2006.01)
*B66C 1/00*    (2006.01)

(52) U.S. Cl. ............... 56/351; 56/364; 414/618; 414/680; 414/729

(58) Field of Classification Search ............ 198/307.1, 198/308.1, 309, 310, 311, 312, 698; 294/116, 294/67.3, 68.21; 405/232; 414/111, 132, 414/391, 560, 618, 685, 711, 739, 743; 56/14.3, 56/14.6, 16.1, 16.4 B, 16.6, 344, 345, 362, 56/364, DIG. 21
See application file for complete search history.

(56) References Cited

U.S. PATENT DOCUMENTS

| 117,204 | A | * | 7/1871 | Preston | 414/442 |
| 1,022,104 | A | * | 4/1912 | Miller | 414/618 |
| 2,674,380 | A | * | 4/1954 | Boudreaux | 414/132 |
| 2,833,429 | A | * | 5/1958 | Shoemaker | 414/560 |
| 2,874,854 | A | * | 2/1959 | Thornton | 414/132 |
| 3,533,525 | A | * | 10/1970 | Cancienne | 414/392 |
| 4,225,034 | A | * | 9/1980 | Sarovich | 198/607 |
| 4,609,318 | A | * | 9/1986 | Rodrigue et al. | 414/132 |
| 2008/0089770 | A1 | * | 4/2008 | Hinds | 414/680 |

* cited by examiner

Primary Examiner—Gregory W Adams

(57) ABSTRACT

A sugar cane loader is provided with a C-shaped chain piler including a grab pocket flanked by a pair of guide rails and including a third guide rail located at a central lower region of the grab pocket. The shape of the chain piler is such as to increase the movement of the stalks for better cleaning during piling, while the guide rails cause the grab to be moved forward during loading such that the cane stalks are moved ahead of tines projecting from the piler chains so that the tines and/or chains are not damaged when the loaded grab is lifted.

8 Claims, 11 Drawing Sheets

Fig. 11

SUGAR CANE LOADER EQUIPPED WITH C-SHAPED CHAIN PILER WITH GRAB GUIDING DURING LOADING

FIELD OF THE INVENTION

The present invention relates to sugar cane loaders, and more specifically, related to grab and piler arrangements for such loaders.

BACKGROUND OF THE INVENTION

In U.S. patent application Ser. No. 11/581,858, filed Oct. 17, 2006, a combined piler and grab structure is described for causing the grab to be rotated to the rear as it is being lowered into the piler pocket. It has been found that when using such a grab with a chain piler that is uniquely curved so as to be substantially C-shaped, as viewed from the side, the grab tines tend to pinch cane stalks against teeth projecting from the piler chains located at opposite sides of the piler pocket, resulting in damage to the teeth and/or chain when the grab is lifted after closing the grab tines into gripping engagement with the piled cane stalks.

The focus of the invention is to construct the chain piler and grab of the loader so as to avoid damage to the piler chains and teeth.

SUMMARY OF THE INVENTION

According to the present invention, there is provided a loader including an improved combined chain piler and grab arrangement.

An object of the invention is to provide a chain piler arrangement and grab arrangement wherein the grab is caused to be moved forwardly as it is moved down into the piler pocket so as to cause cane stalks to be freed from contact with the cane conveyor teeth carried by the piler chains prior to the grab tines being closed about a pile of cane existing at the forward side of the piler. This object is accomplished by providing the rear of the rear grab tine with an abutment surface arrangement, and the rear region of the piler pocket with a guide rail arrangement which cooperates with the abutment surface arrangement when the rear grab tine is lowered into the piler pocket so as to cause the grab to be guided forwardly.

This and other objects of the invention will become apparent from a reading of the ensuring description together with the appended drawings.

DESCRIPTION OF THE PREFERRED EMBODIMENT

Figure 1:
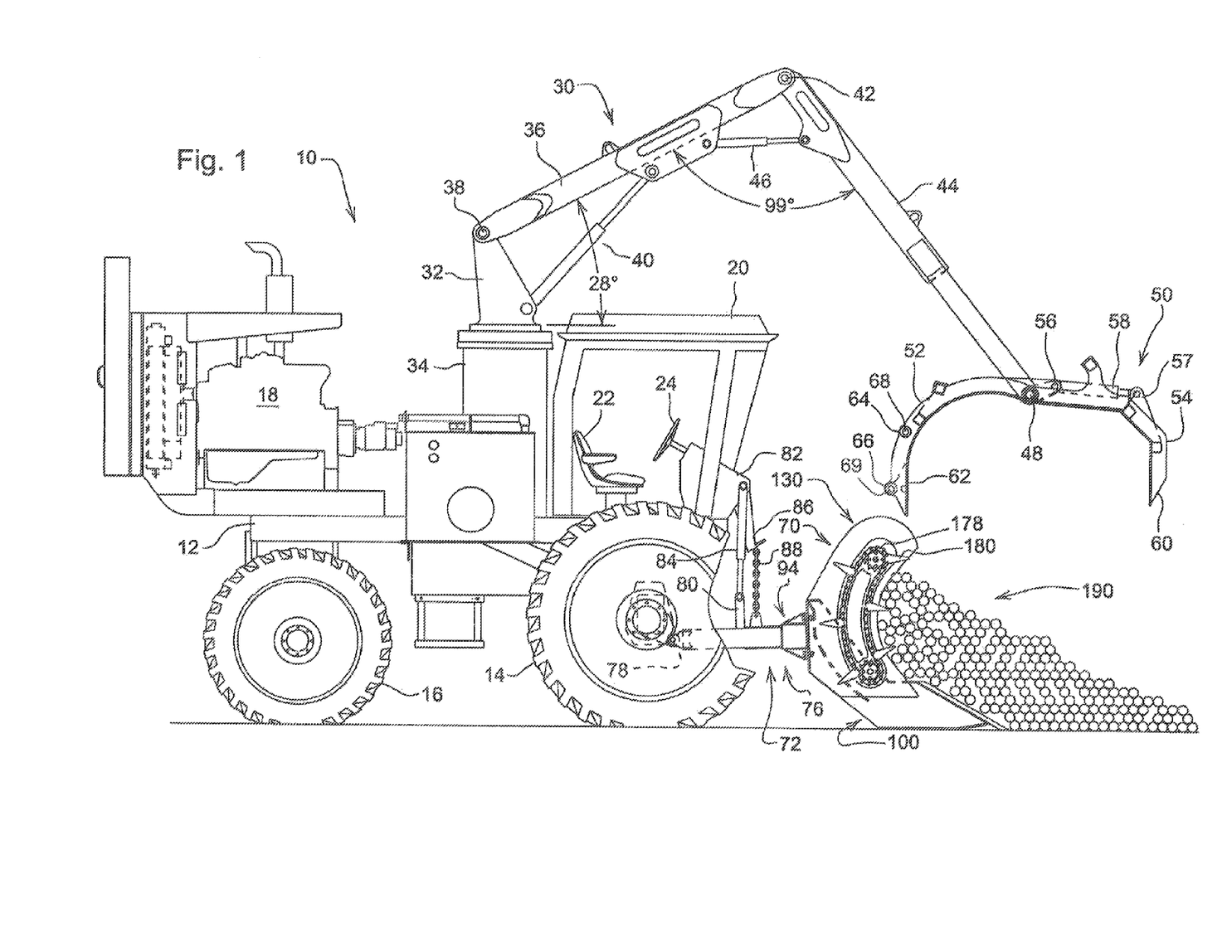
FIG. 1 is a right side view of a sugar cane loader equipment with a grab and chain piler arrangement constructed in accordance with the principles of the present invention.

Referring now to FIG. 1, there is shown a sugar cane loader 10 including a loader boom arrangement 30, a grab arrangement 50 and a chain piler arrangement 70.

The sugar cane loader includes a main frame 12 supported on front and rear pairs of drive wheels 14 and 16, respectively, with the rear wheels 16 being steerable, in a well known manner (not shown). Power for diving he wheels and for operating the various hydraulic functions of the loader 10 is supplied by an internal combustion engine 18 supported on a rear region of the frame 12. Provided on a forward region of the frame 12 is an operator's cab 20 containing a seat 22 located within reach of various manually operated controls, of which only a steering wheel 24 is shown.

The loader boom arrangement 30 is mounted at a central region of the main frame 12, just to the rear of the cab 20. The loader boom arrangement 30 includes an upright mast 32 mounted to a pedestal 34 for being selectively rotated about a vertical axis, in a manner well known in the art. An inner boom 36 has a first end pivotally coupled, by a horizontal pivot arrangement 38, to an upper end of the mast 32 for being swung vertically by a first extensible and retractable hydraulic boom cylinder 40. The inner boom 36 has a second end pivotally coupled, by a horizontal pivot arrangement 42, to a first end of an outer boom 44, and a second extensible and retractable hydraulic boom cylinder 46 is coupled between the inner and outer booms 36 and 44 for pivoting the outer boom 44 about the pivot arrangement 42. Pivotally mounted to a second end of the outer boom 46, by a horizontal pivot arrangement 48 so as to be freely suspended, is a grab assembly 50.

Figure 2:
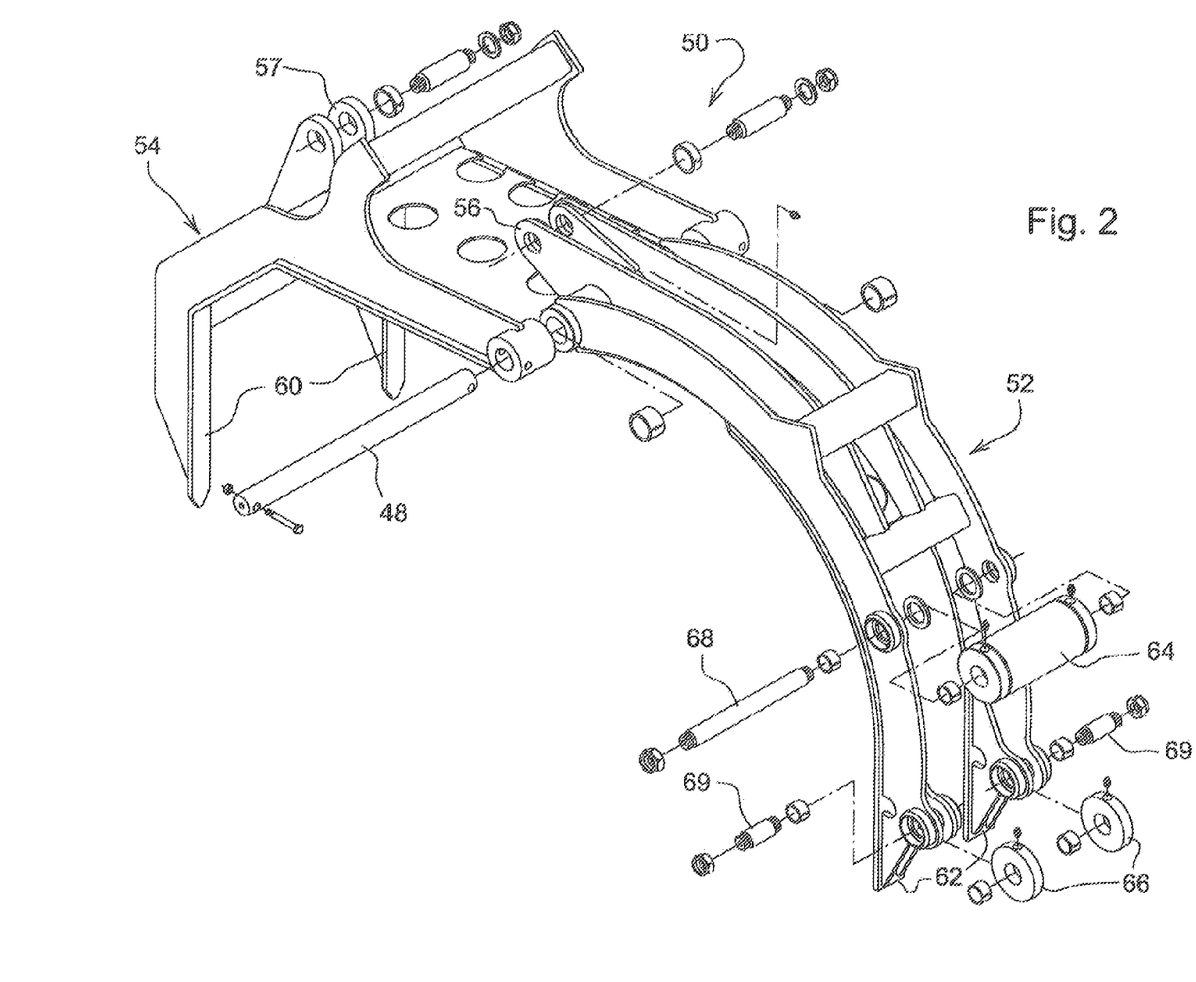
FIG. 2 is a left rear perspective exploded view of the grab shown in FIG. 1, but omitting the hydraulic grab cylinder.
Figure 7:
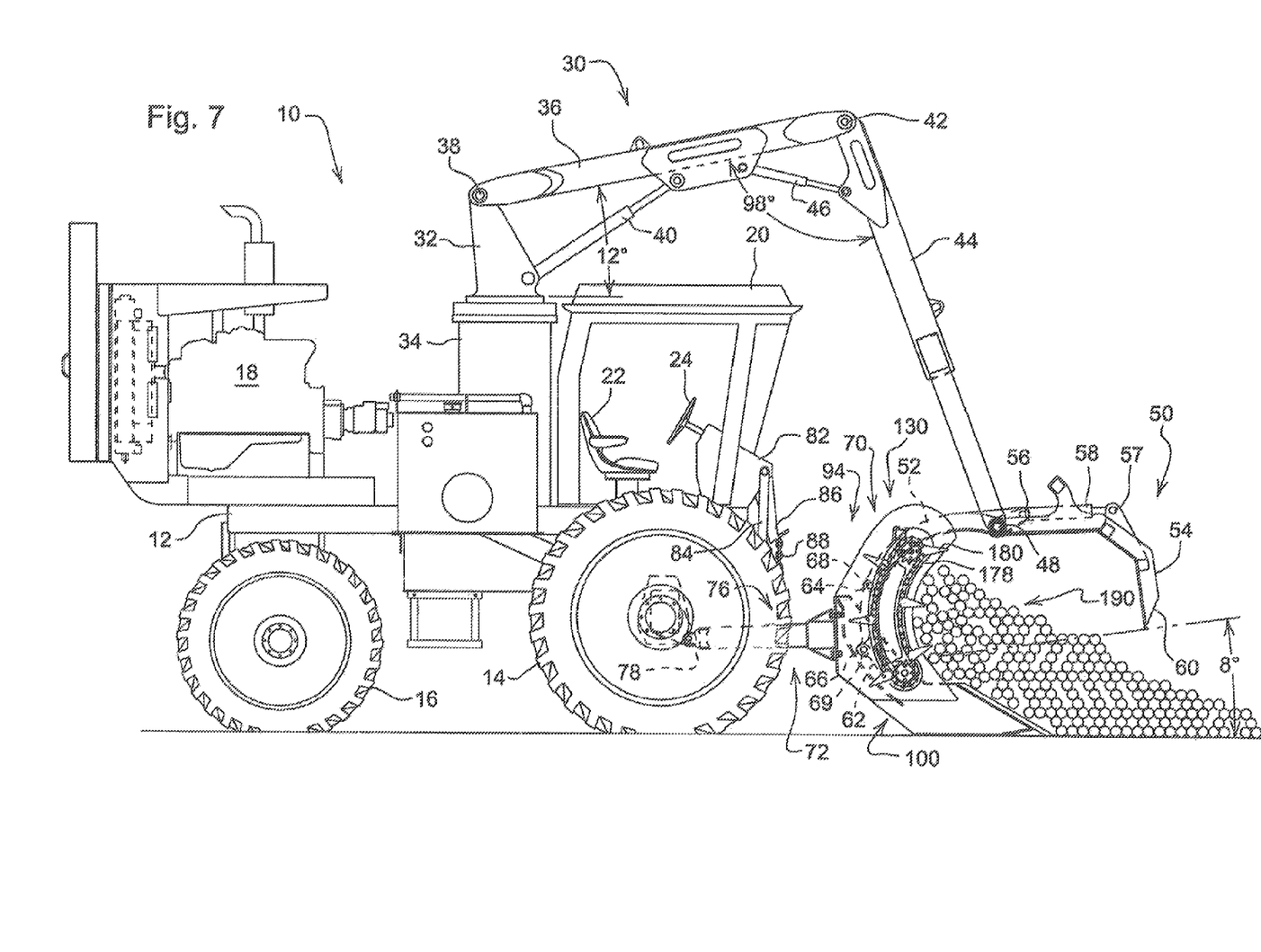

Referring now also to FIG. 2, it can be seen that the grab assembly 50 includes a curved rear grab tine 52 and an angled, opposing front grab tine 54. A first cylinder mounting bracket 56 is carried on the rear grab tine 52 adjacent the pivot arrangement 48. Mounted between the cylinder mounting bracket 56 and an second cylinder mounting bracket 57 projecting upwardly from the front grab tine 54 at a location, approximately halfway along its length, is an extensible and retractable hydraulic grab cylinder 58. The grab cylinder 58 is selectively operates so as to open the grab assembly 50, when the cylinder is retracted, as shown in FIG. 1, for example, and to close the grab assembly 50, when the cylinder 58 is extended, as shown in FIG. 7. The front grab tine 54 includes opposite sides which terminate in a pair of spaced apart tine end sections 60 located for straddling a pair of tine end sections 62 of the rear grab tine 46 when the grab tine assembly 50 is completely closed.

Coupled to a back side of the rear grapple tine 52 in a region, which constitutes approximately the lower third of a length dimension of the tine, is an abutment assembly including a first roller 64 extending between an upper region of the tine end sections 62, as viewed in FIG. 1, and a lower pair of rollers 66, mounted one to a lower region of each tine end section 62. The first roller 64 is mounted for rotation about a shaft 68 having its opposite ends respectively fixed to the pair of end sections 62. The lower pair of rollers 66 are respectively mounted to a pair of shafts 69 that are respectively fixed to lower rear locations of the pair of end sections 62 of the rear grab tine 52. Thus, the first roller 64 is located to move in a path which is inward of separate paths followed by the lower rollers 66.

Figure 3:
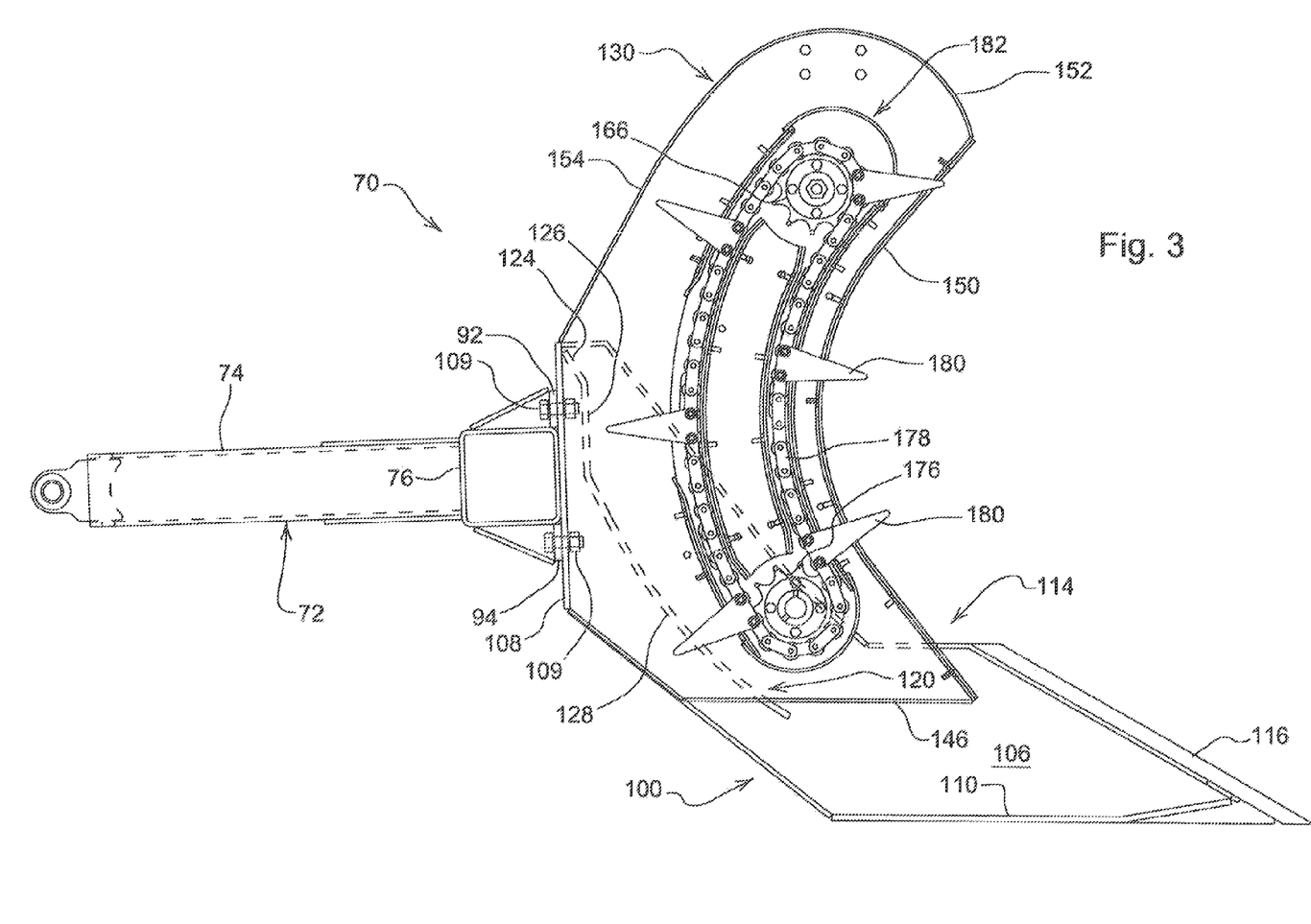
FIG. 3 is an enlarged right side view of the chain piler assembly shown in FIG. 1.
Figure 4:
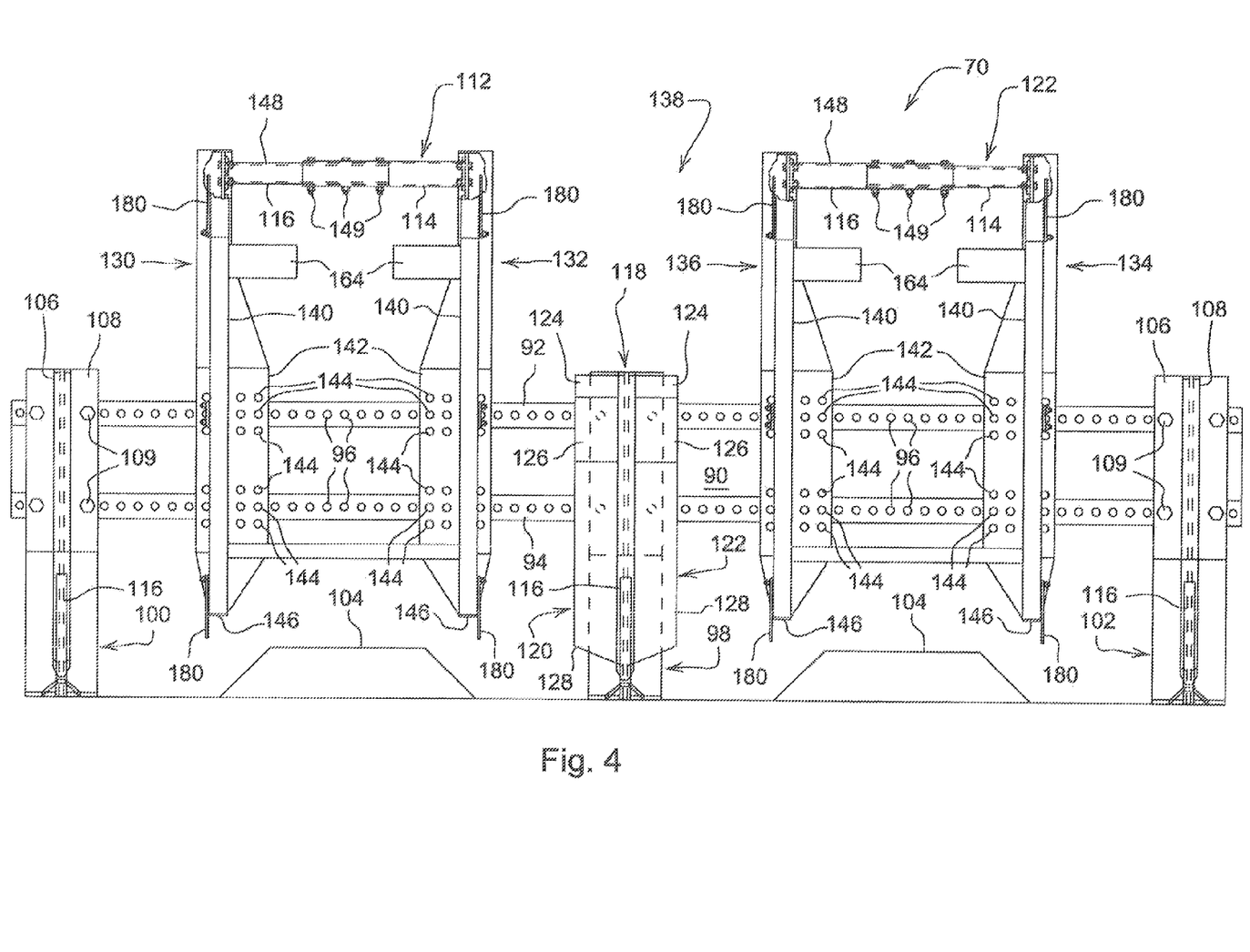
FIG. 4 is a front view of the chain piler assembly shown in FIG. 2.
Figure 5:
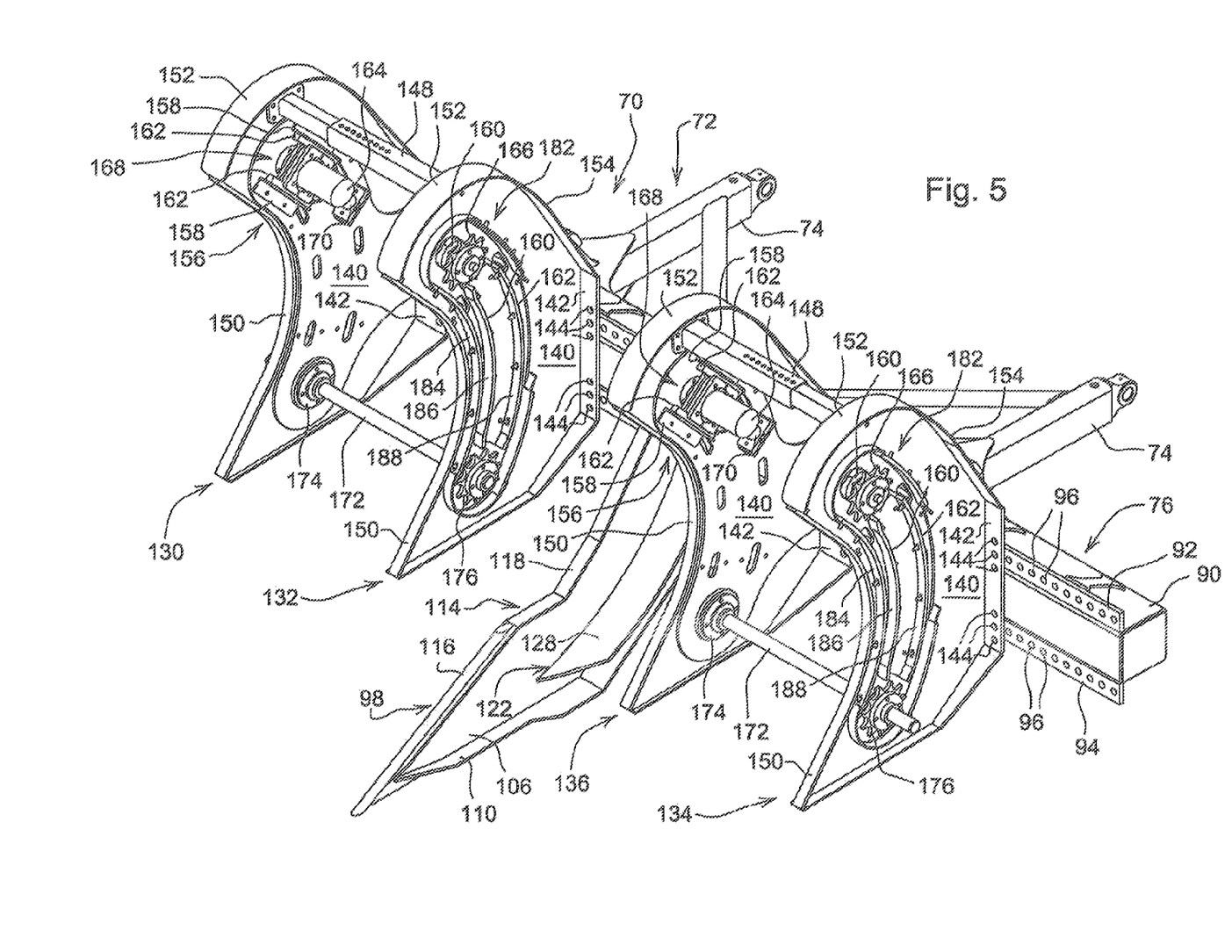
FIG. 5 is a left front perspective view of the chain piler assembly shown in FIG. 4, but omitting the piler chains and the right- and left-hand end push lifters.

Referring now also to FIGS. 3-5, it can be seen that the piler arrangement 70 includes a frame assembly 72 including a pair of transversely spaced arms 74 joined at their forward ends to a cross beam 76 and having rear ends pivotally mounted to a lower front region of the main frame 12 for swinging vertically about a horizontal axis defined by respective horizontal pivot assemblies 78. A pair of upstanding brackets 80 are respectively joined to the pair of arms 74, and coupled between each bracket 80 and one of a pair of brackets 82 joined to the main frame 12, is an extensible and retractable, hydraulic piler lift cylinder 84. Formed at a lower end of each of the brackets 82 is a chain mounting bracket 86 containing a key hole shaped opening receiving a chain 88 having an end fixed to the cross beam 76 of the piler frame 72, with a selected link of the chain being placed in the smaller section of the key hole shaped opening, whereby the chain 88 serves as a down stop for preventing the piler arrangement 70 from being lowered to the extend that it digs into the soil.

The cross beam 76 of the frame assembly 72 includes a main beam member 90, of square cross section. Fixed to and projecting vertically upward from a upper front corner of the beam member 90 is an upper mounting strip 92 extending an entire length of the beam. Similarly, fixed to and projecting vertically downward from a lower front corner of the beam 90 is a lower mounting strip 94. Each of the mounting strips 92 and 94 contains a plurality of horizontally spaced mounting holes 96.

With reference especially to FIGS. 4 and 5, it can be seen that a middle cane stalk push lifter 98 is mounted to the upper and lower mounting strips 92 and 94 at a location centered between right- and left-hand cane stalk push lifters 100 and 102, respectively, mounted to opposite ends of the strips. The spacing between the middle push lifter 98 and the end cane stalk push lifters 100 and 102 is selected to be equal to the spacing between adjacent cane stalk rows 104, with the lifters 98, 100, 102 being adapted for operating centrally between adjacent cane rows 104. The push lifters 98, 100, 102 each comprise a central, vertical plate structure 106 having a stepped, upwardly and rearwardly inclined leading edge having an upper end joined to a rear edge defined by a vertical edge section to which is joined a downwardly and forwardly inclined edge section, which is, in turn, joined to a horizontal bottom edge. Welded to the vertical edge section is a vertical mounting plate 108 that extends beyond opposite sides of the plate structure 106 and has a top and a bottom respectively located at a height above the upper mounting strip 92, and at a height below the lower mounting strip 94. The mounting plate 108 of each push lifter 98, 100 and 102 contains upper and lower sets of holes which register with selected ones of the holes 96 provided in the mounting strips 92 and 94, with bolt fasteners 109 being provided at the aligned holes for securing the push lifters 98, 100 and 102 to cross beam 76. Welded to, and extending beyond opposite sides of the inclined rear edge section, and all but a small forward region of the horizontal bottom edge section of the respective plate structures 106 of the push lifters 98, 100, and 102 is a plate defining a skid shoe 110 having a forward end section that is bifurcated and inclined upwardly and forwardly at opposite sides of the plate structure 106. This inclined forward end section of the skid shoe 110 presents a surface which tends to prevent the push lifters from digging into the ground. The inclined, has a covering strip assembly 114 welded thereto. Welded to a lower inclined section of the covered leading edge is a wear resistant rod 116 having an upper end that terminates at a lower step of the covered leading edge.

Concerning only the middle push lifter 98, that portion of the strip assembly 114, not engaged by the rod 116, forms a guide rail 118, which includes upper and lower horizontal sections joined by an upwardly and rearwardly inclined middle section. Also relating only to the middle push lifter 98, are right- and left-hand guide rails 120 and 122 that are joined to opposite sides of the vertical plate structure 106 of the push lifter 98 so as to be behind the guide rail 118. The guide rails 120 and 122 each have a relatively short upper end section 124 which parallels the middle section of the guide rail 118, a relatively short middle section 126, which extends substantially parallel to the mounting plate 10, and a relatively long, downwardly and forwardly curved lower end section 128 having a lower end which terminates vertically below the lower horizontal section of the middle guide rail 118. The purpose of the guide rails 118, 120 and 122 is to properly position the grab assembly 50, as explained in further detail below, during the operation of grabbing a load of cane stalks that have been piled by the chain piler assembly 70.

The inclined rods 116 and the relatively narrow strip assemblies 114 at the forward edges of the push lifters 98, 100 and 102 operate during forward movement of the piler assembly 70 to lift sugar cane stalks, lying in windrows on the ground, upwardly into engagement with a plurality of chain piler units including a right-hand pair of outer and inner chain piler units 130 and 132, and a left-hand pair of outer and inner chain piler units 134 and 136, with the inner and outer units being mirror images of each other. The right-hand pair of chain piler units 130 and 132 are mounted to the upper and lower mounting strips 92 and 94 so as to be centered between the middle and right-hand push lifter units 98 and 100, and are spaced from each other so as to be centered above a respective cane row 104. Similarly, the left-hand pair of chain piler units 134 and 136 are mounted to the mounting strips 92 and 94 so as to be centered between the middle and left-hand push lifters 98 and 102, and are spaced from each other so as to be centered above another one of the cane rows 104. A piler pocket 138 (FIG. 3) is defined between the inner chain piler units 132 and 136 into which the rear loader grab tine 52 may be inserted for picking up a pile of cane produced by the chain piler assembly 70, as is described in further detail below.

Each of the chain piler units 130, 132, 134, and 136 includes a vertical chain support structure 140 having a vertical rear edge to which is welded a vertical mounting plate 142 containing upper and lower sets of mounting holes 144 that are respectively brought into register with selected ones of the mounting holes 96 provided in the upper and lower mounting strips 92 and 94. Bolt fasteners (not shown, but like the fasteners 109) are inserted through the registered holes so as to secure the chain piler units to the cross beam 76. The chain support structures 140 each include a horizontal bottom edge 146 which terminates at a height spaced above the ground, which is slightly less than the height at which upper ends of the rods 116 of the push lifters 98, 100 and 102 terminate.

Extending between, and having opposite ends secured to an upper region of the chain support structures 140 of each of the right-hand pair of piler chain units 130 and 132 is a telescopic cross brace 148 which is fixed at an adjusted length by a plurality of fasteners 149 inserted through aligned holes provided in he telescoping sections of the brace 148. A similar brace 148 is provided between an upper region of each of the chain support structures 140 of the left-hand pair of piler chain units 134 and 136. The chain support structures 140 each include a forwardly opening, generally C-shaped front surface 150 which extends between a forward end of the bottom edge 146 and a front of a curved tip edge 152, the latter having a rear end which terminates at, and is joined to an upper end of, a rear edge 154 which inclines downwardly to an upper end of the vertical mounting plate 142.

Fixed to an upper region of the inner surface of the chain support structure 140 of each of the piler chain units 130 and 134, and to an upper region of the outer surface of the chain support structure 140 of each of the piler chain units 132 and 136, are respective head shaft guide assemblies 156, which each includes a pair of angle members 158 arranged parallel to each other and having first sides respectively fixed at opposite sides of an upwardly and forwardly inclined oval opening 160. Vertical sides of the angle members 158 each have a guide bar 162 fixed along its length. A hydraulic motor 164 includes an output shaft (not visible) defining a head shaft which projects through the opening 160 and mounted to the head shaft, so as to be on an opposite side of the chain support structure 140 from the motor 164, is a chain sprocket 166. A guide rail assembly 168 is fixed to the motor 164 and is mounted for sliding along the guide bars 162. An extensible and retractable hydraulic actuator 170 has a rod end coupled to a bracket carried by the motor 164 and a cylinder coupled to a bracket fixed to the chain support structure 140, with the actuator 170 being operable for selectively effecting up or down movement of the motor 164, and, hence, the head shaft, within the oval opening 160, for a purpose explained below.

Located in a lower region of each of the chain support structure 140 of the chain piler units 130, 132, 134 and 136 so as to be substantially vertically below the oval openings 160, are respective horizontally aligned openings. Received in the openings provided in the right-hand pair of chain piler units 130 and 132 is a first shaft 172, and received in the openings provided in the left-hand pair of chain piler units 134 and 136 is a second shaft 172. The shafts 172 are supported in bearing assemblies 174 fixed to confronting surfaces of the support structures 140 of the piler units 130 and 132, and in confronting surfaces of the support structures 140 of the piler units 134 and 136. Mounted to opposite ends of the shafts 172 are respective chain sprockets 176. An endless roller chain 178 (see FIG. 2) is trained about each set of sprockets 166 and 176, and fixed to an outer side of each of the chains 178, relative to the support structure 140, by link pins passing through the chain rollers, is a plurality of triangular, flat cane conveyor teeth 180. The path traveled by the chain 178 is determined by a chain guide arrangement 182 including an outer, generally kidney-shaped guide member 184 having upper and lower ends extending about the sprockets 166 and 176. A forward side of the guide member 184 is spaced behind and extends substantially parallel to the front edge 150 of the chain support structure 140. The height of the guide member 184 from the chain support structure 140 is such that the conveyor teeth 180 project beyond the guide member 184, with the teeth 180 being sufficiently long that as they travel adjacent a forward side of the guide member 184 they project forwardly beyond the front edge 150 of the chain support structure 140. Each chain guide arrangement 182 further includes front and rear guide members 186 and 188 which extend between the sprockets 166 and 177 and are disposed substantially parallel to each other and to a forward side of the outer guide member 184.

The operation of the loader 10, and in particular the grab arrangement 50 and the piler arrangement 70 is as follows. Initially, the piler arrangement 70 is lowered to a working height, as shown in FIG. 1, and the loader 10 is advanced forwardly over cane stalks which have been cut and laid generally crosswise to the cane row or rows 104 to form a windrow 190. The inclined rods 116 of the forward edge arrangements 114 of the push lifters 98, 100, and 102 contact the cane stalk windrow 190 and cause the stalks to be elevated into a zone in engagement with the forwardly curved edges 150 of the chain piler units 130, 132, 134 and 136, with these edges 150 acting to cause the cane stalks to roll forwardly and form a cane stalk pile 192. This rolling action causes soil to be dislodged from the cane stalks and is aided by the chains 176 which, at this time, are being driven counter clockwise, as viewed in FIG. 3, by the hydraulic motors 164. More specifically, this rotation of the chains 176 results in the conveyor teeth 180 engaging cane stalks, with the forwardly extending component of the upper region of the front runs of the chains 178 resulting in the cane stalks carried by the teeth 180 being ejected forwardly onto the forming a pile.

Once the pile 192 has been formed, as shown in FIG. 1, for example, the grab assembly 50 is opened fully, by completely retracting the actuator 58, and positioned with the rear and front tines 52 and 54 arranged in fore-and-aft alignment with each other and with the piler pocket 138. Because the grab assembly 50 hangs free at the pivot arrangement 48, the lower ends of the tines 52 and 54 are disposed in first and second, approximately horizontal planes due to the angled front tine 54 being shorter than the curved rear tine 52.

With the illustrated loader 10, the initial positioning of the grab assembly 50, as shown in FIG. 1, is accomplished by operating the first boom cylinder 40 so as to lower the inner boom 36 to an angle of about 28° to the horizontal and by operating the second boom cylinder 46 so as to dispose the outer boom 44 such that it makes and angle of approximately 99° with the inner boom 36. A seated operator can easily see when the lower end of the rear grab tine 52 is adjacent an upper, forward end of the chain piler units 132 and 136, which is the proper initial position of the grab assembly 50.

Figure 6:
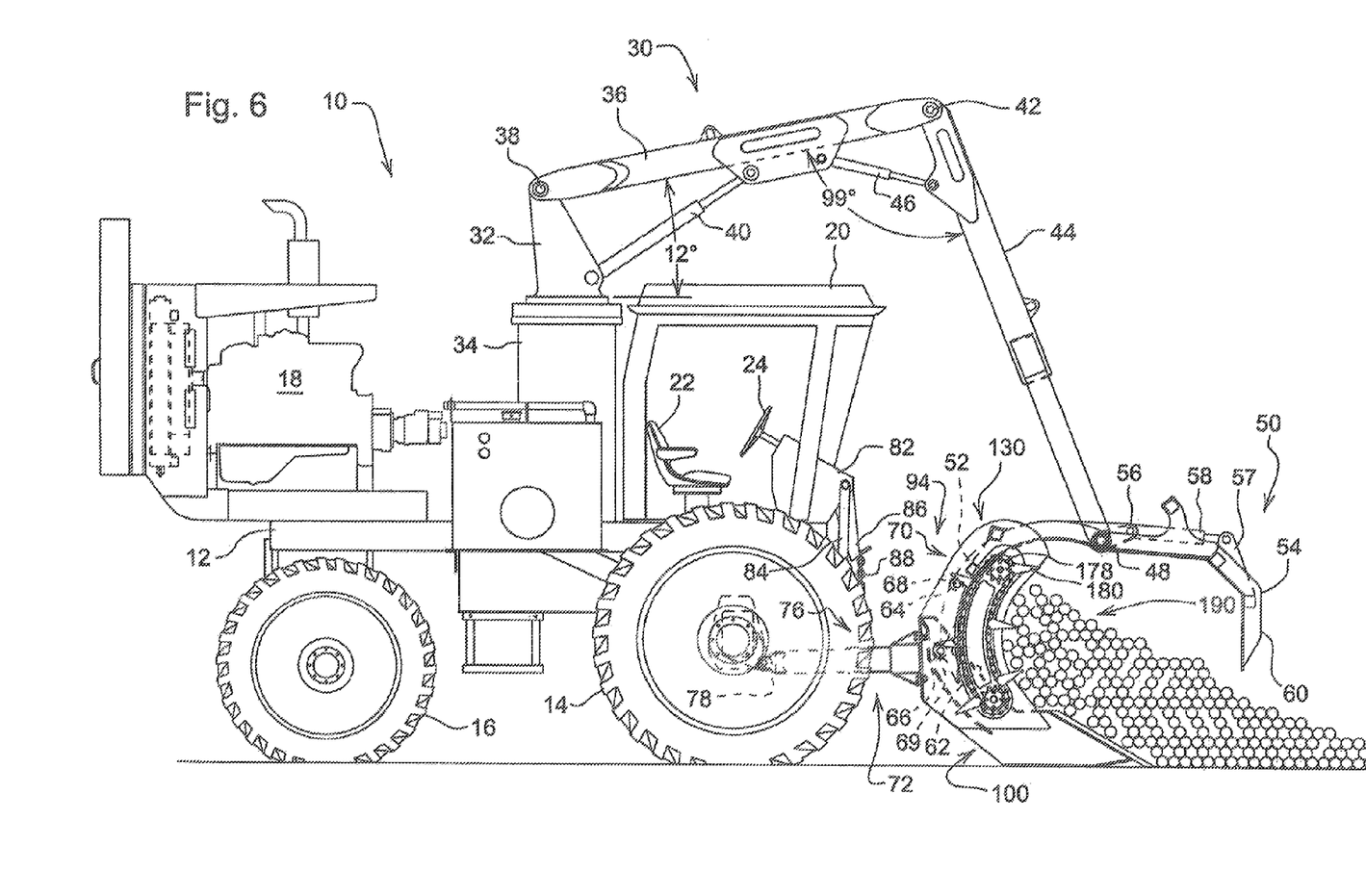
FIGS. 6-11 are views like FIG. 1, but showing a progression of positions of the grab as it is lowered into the piler pocket during positioning for engaging and picking up piled sugar cane stalks.

Referring now to FIG. 6, the next step in the operation is to lower the inner boom 36 by about 16°, which causes the rear tine 52 to enter the piler pocket 138, with the lower, spaced rollers 66 then respectively coming into engagement with upper regions of the outer guide rails 120 and 122.

Proceeding to FIG. 7, the next step is to lower the outer boom 44 by 1° degree which causes the lower rollers 66 to ride down the curved regions 128 of the outer guide rails 120 and 122, which results in the grab assembly 50 being rotated 8° to the rear (counter clockwise).

Figure 8:
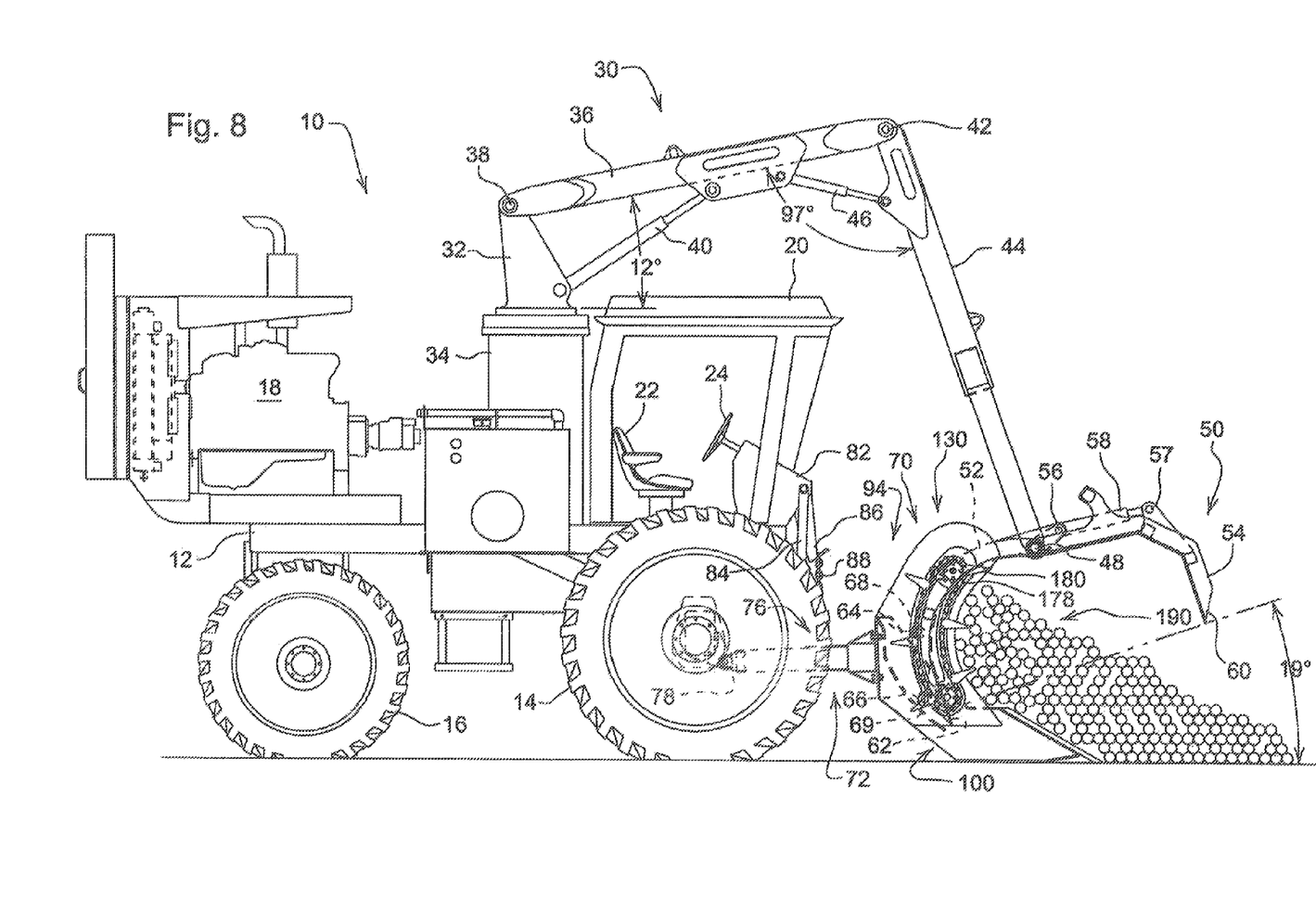

Proceeding to FIG. 8, there the boom 44 has been lowered by another 1°, which causes the lower rollers 66 to ride further down the curved regions 128 of the outer guide rails 120 and 122. The force imposed on the rollers 66, as the boom 44 is lowered, causes the grab assembly 50 to be rotated another 11° counter clockwise, or to the rear, about the pivot arrangement 48. At this time the upper roller 64 is just coming into engagement with the downwardly and forwardly inclined middle guide rail 118.

Figure 9:
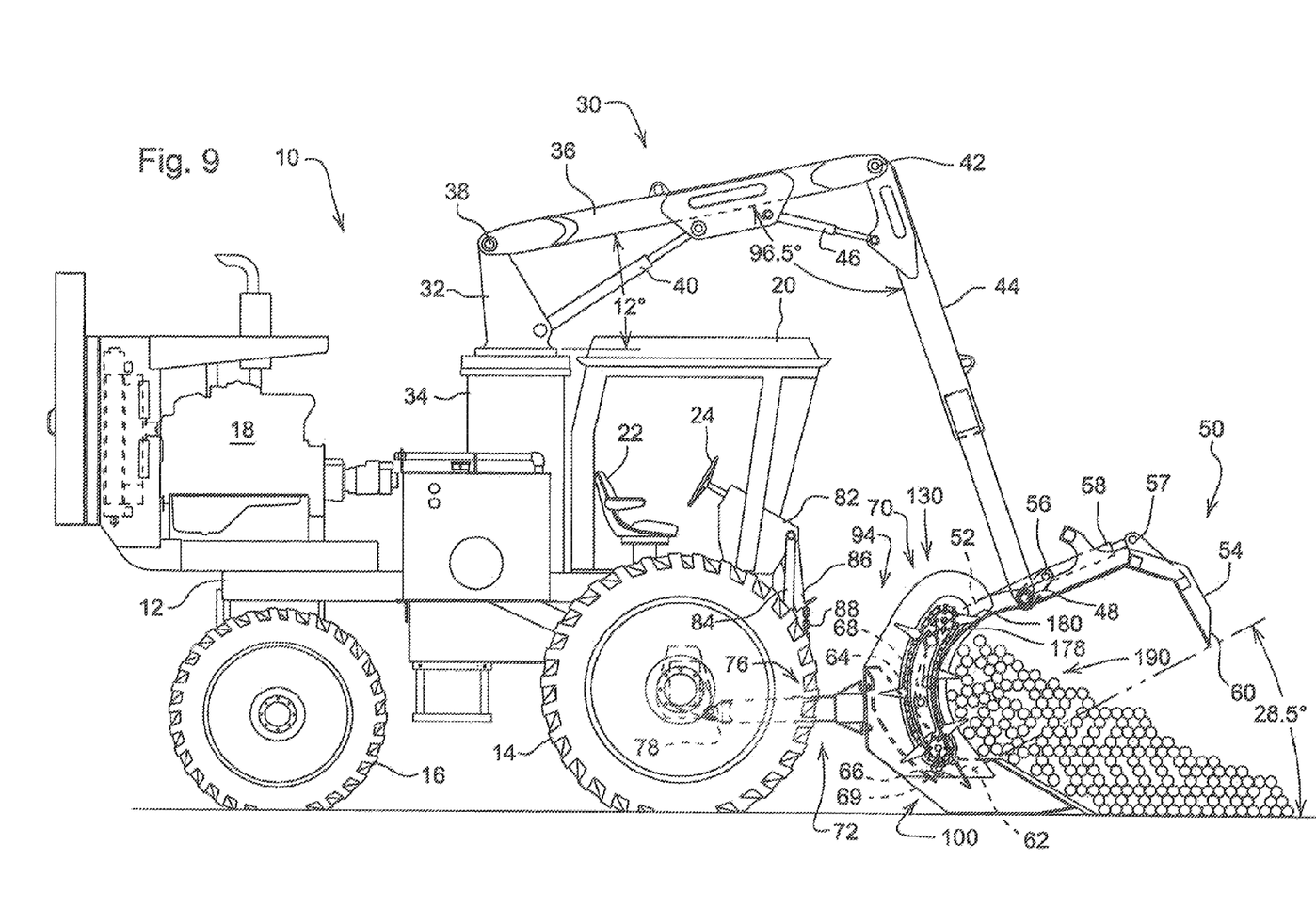
Figure 10:
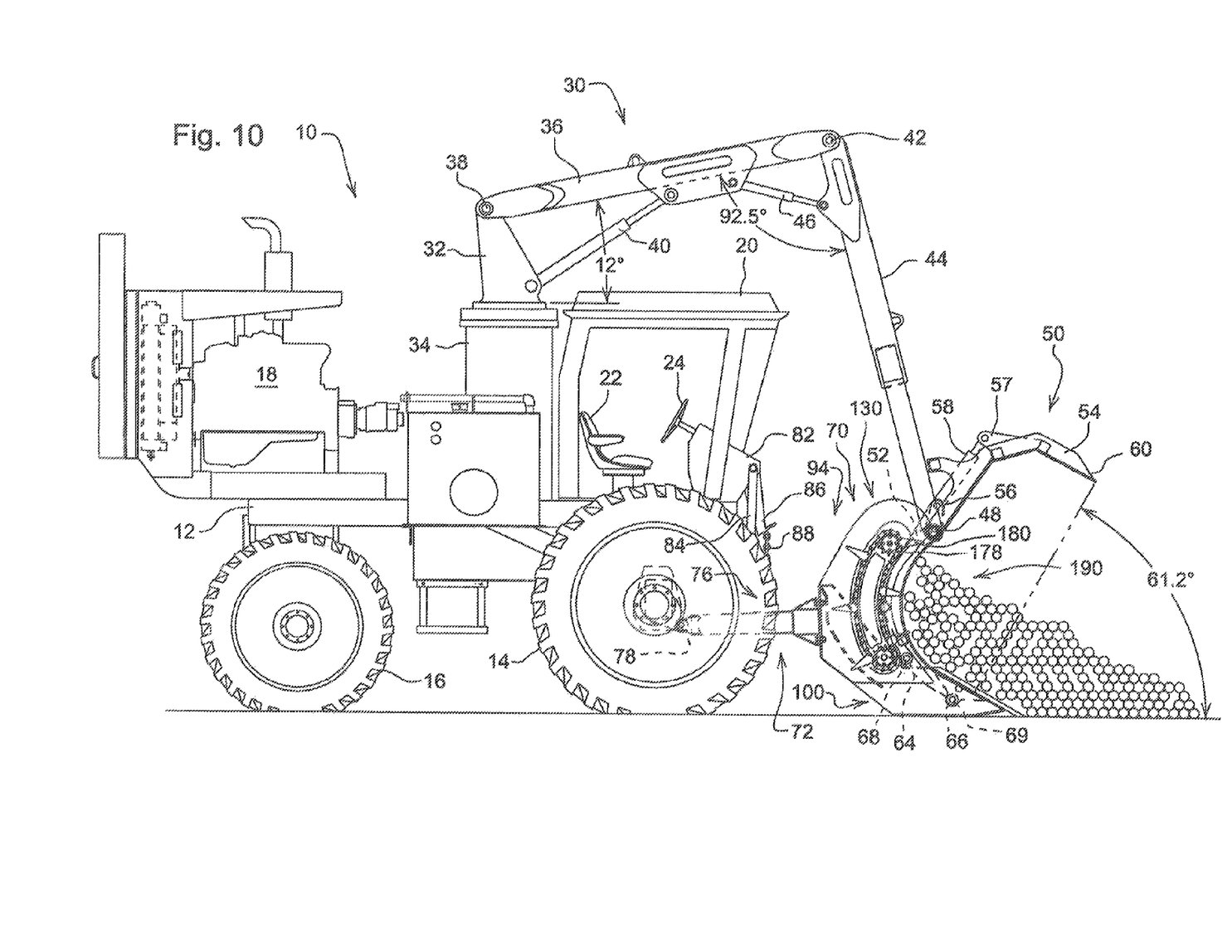

Then, upon lowering the outer boom 44 another ½°, as shown in FIG. 9, the force resulting due to the contact of the roller 64 with the middle guide rail 118 causes the grab assembly 50 to be rotated another 9.5°counter clockwise about the pivot assembly 48, which results in the lower rollers 66 being lifted off the outer guide rails 120 and 122. Finally, the outer boom 44 is lowered another 3°, as shown in FIG. 10, resulting in the top center roller 64 reaching the horizontal step of the bottom of the center guide rail 118, and in the grab assembly 50 undergoing another 32.7° rotation to the rear about the pivot arrangement 48. Most important however is the fact that this downward movement of the roller 64 has resulted in the curved rear tine 52 acting to force the cane pile forward of the teeth 180 of the piler chains 178. Neither the inner boom 36 nor the outer boom 44 can now move lower due to the center roller 64 being in contact with the horizontal step, with it being noted that the lower rollers 66 are now the lowest part of the grab tine 52 and are spaced above the ground level. Therefore, the operator is kept from forcing the rear grab tine 52 into the soil.

The operator will recognize when this condition exists and will know that the grab assembly 50 is now positioned for being operated to be clamped onto a load of cane stalks contained in the pile. This accomplished by actuating the hydraulic cylinder 58 so that it extends and closes the front tine 54 by effecting a 75° clockwise rotation of front tine 54, with such an amount of closing being sufficient to cause the grab to exert enough squeeze on the engaged cane stalks to keep them from falling out during the lifting phase. It is to be noted that because the can stalks are now free of the conveyor teeth 180, neither these teeth, nor the piler chains 178 to which the teeth are attached, will be subject to damage as the gripped load of cane stalks is lifted.

Figure 11:
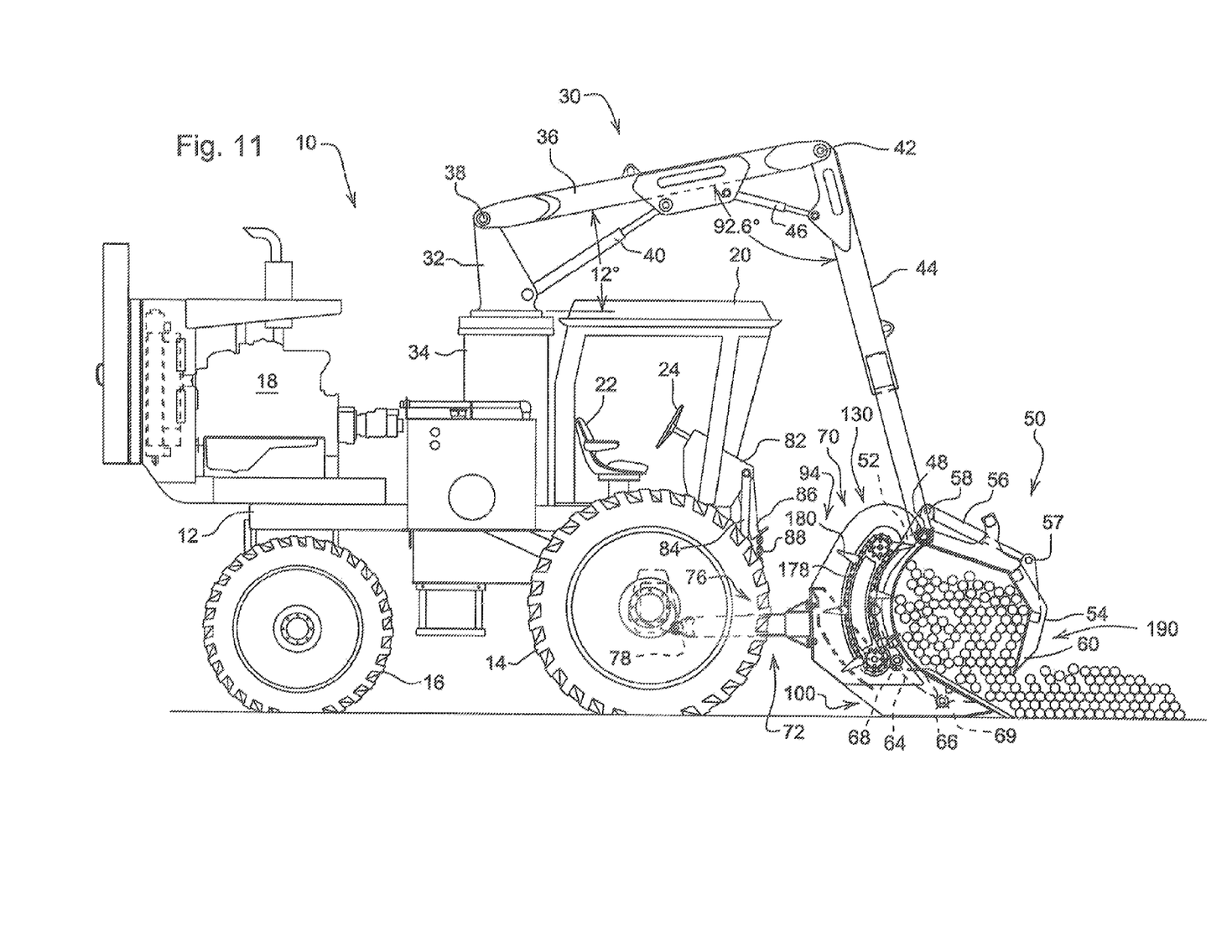

Once the tines 52 and 54 are closed sufficiently for the grab assembly 50 to hold a gripped mass of the piled cane stalks, as illustrated in FIG. 11, the booms 36 and 44 are raised by extending the cylinders 40 and 46, and the mast 32 is rotated so as to dispose the loaded grab assembly 50 over a mobile container (not shown) for hauling cane stalks. The tine cylinder 58 is then contracted so as to open the tine 54 and release the gripped mass of cane stalks into the mobile container. The operator then drives the loader 10 ahead so as to pile more cane stalks while once again lowering and swiveling the boom assembly 30 so as to position the grab assembly 50 for picking up the next bunch of piled cane stalks.

Having described the preferred embodiment, it will become apparent the various modifications can be made without departing from the scope of the invention as defined in the accompany claims.

The invention claimed is:

1. In a mobile wholestalk sugar cane loader including a main frame, a chain piler assembly supported at a forward region of said main frame and including a transverse beam member, a pair of transversely spaced upright piler devices being fixed to said beam member so as to define a forwardly opening piler pocket between them and each piler device including a front surface and a chain support structure rearward of said front surface embodying at least one set of vertically spaced, upper and lower sprockets, a roller chain, formed into a loop, being trained about said upper and lower sprockets and conveyor teeth mounted to, and projecting from, spaced locations along said loop, whereby said pair of piler devices of said piler assembly is operable for creating piles of cut sugar cane stalks in front of said piler pocket as the loader moves forwardly along a windrow of cane stalks, and a loader boom arrangement including an upright mast mounted to said main frame for rotation about an upright axis, an inner boom having an inner end pivotally mounted to said mast for movement about a first horizontal axis, a first hydraulic boom cylinder coupled between said mast and said inner boom, an outer boom having an inner end pivotally mounted to an outer end of said inner boom for movement about a second horizontal axis, a second hydraulic boom cylinder coupled between said inner and outer booms, a grab assembly including opposed first and second grab tines pivotally mounted to an outer end of said outer boom for movement together about a horizontal grab axis and for selected movement about said grapple axis toward and away from each other, a grab cylinder arrangement being coupled between said first and second grab tines for selectively opening and closing said tines, with said boom assembly being operable for disposing said grab axis transversely such that said first and second tines of said grab assembly are in fore-and-aft alignment with each other and with said piler pocket and such that said first grab tine is behind said second grab tine and for lowering said grab assembly such that said first grab tine enters said piler pocket, the improvement comprising: said front surface of each piler device having a profile which is curved from top to bottom so as to be rearwardly concave; each said piler chain support structure supporting said at least one chain so that at least a forward run of said chain loop has a forwardly facing, curved profile which generally parallels and is spaced rearwardly of an adjacent front surface at a distance less than a length of said teeth, whereby teeth located along said forward run of said chain loop project forwardly of said adjacent front surface; said piler pocket having a back side located at said beam member; a guide rail arrangement being mounted to said beam member and extending forwardly and downwardly from said back side of said piler pocket; and said first grab tine, as considered when said grab assembly is disposed with said first and second grab tines in fore-and-aft alignment with each other and with said piler pocket, having a back side provided with a contact surface arrangement so configured relative to said guide rail arrangement that lowering of said first grab tine of said grab assembly into said piler pocket while moving said grab axis toward said piler pocket results in said grab assembly, as viewed from a right side of the grab assembly, undergoing increasing counterclockwise rotation about said grab axis as the grab assembly is increasingly lowered and the grab axis is increasingly moved toward said oiler pocket, and finally causes forward movement of said grab assembly until said first grab tine displaces cane stalks forwardly of said conveyor teeth mounted to said forward run of said loop, whereby said first and second grab tines of said grab assembly may be closed and lifted while loaded with cane stalks without causing damage to either said chain or said teeth.

2. The loader, as defined in claim 1, wherein said guide rail arrangement includes a middle guide rail and first and second outer guide rails located behind, and spaced from opposite sides of, said middle guide rail; and said first grab tine having a lower bifurcated section defining a pair of lower tine segments having a free space between them which permits the middle guide rail to pass freely between the lower tine segments when the first grab tine is lowered into said piler pocket; and said contact surface arrangement including first and second contact surfaces respectively located at lower rear locations of said pair of lower tine segments so as to come into contact with said first and second guide rails when said first grab tine is lowered into said piler pocket; and said contact surface arrangement further including a third contact surface located for contacting said third guide rail when said grab assembly is lowered an additional amount after initial contact between said first and second contact surfaces and said first and second guide rails, with said first and second guide rails being shaped to cause said rearward rotation of said grab assembly, and with said third guide rail being shaped to cause rearward rotation of, and said forward movement of, said grab assembly.

3. The loader, as defined in claim 2, wherein said first and second guide rails extend downwardly and forwardly to respective lower ends which are spaced above the ground when the piler arrangement is in ground engagement.

4. The loader, as defined in claim 2, wherein said third guide rail is inclined downwardly and forwardly to a substantially horizontal lower end region having a forward extent approximately equal to that of the forward surfaces of said pair of piler devices.

5. The loader, as defined in claim 2, wherein said middle guide rail has a horizontal lower end which acts as a stop preventing further lowering of said grab assembly once said third contact surface comes into engagement with said horizontal lower end, and said first tine being held above ground level when said third contact surface is engaged with said horizontal lower end of said middle guide rail.

6. The loader, as defined in claim 2, wherein said piler assembly further includes a push lifter located centrally in said piler pocket; said push lifter including a vertical plate structure having a leading edge including lower and central upwardly and rearwardly inclined sections joined by a horizontal section; said leading edge defining said middle guide rail, and said first and second guide rails being fixed to opposite sides of said vertical plate structure.

7. The loader, as defined in claim 6, wherein said horizontal section is spaced above ground level such that, when said middle contact surface is in engagement with said horizontal section, a lower end of said first tine is also elevated above ground level.

8. The loader, as defined in claim 2 wherein first and second rollers respectively define said first and second contact surfaces, and a third roller defines said third contact surface.

* * * * *